(12) United States Patent
Novak

(10) Patent No.: US 9,106,715 B1
(45) Date of Patent: Aug. 11, 2015

(54) SYSTEM AND METHOD FOR RAPID DISSEMINATION OF IMAGE PRODUCTS

(71) Applicant: Justin R. Novak, Huntsville, AL (US)

(72) Inventor: Justin R. Novak, Huntsville, AL (US)

(73) Assignee: The United States of America, as represented by the Secretary of the Army, Washington, DC (US)

(*) Notice: Subject to any disclaimer, the term of this patent is extended or adjusted under 35 U.S.C. 154(b) by 328 days.

(21) Appl. No.: 13/840,890

(22) Filed: Mar. 15, 2013

Related U.S. Application Data

(60) Provisional application No. 61/620,647, filed on Apr. 5, 2012, provisional application No. 61/637,485, filed on Apr. 24, 2012, provisional application No. 61/637,890, filed on Apr. 25, 2012.

(51) Int. Cl.
*H04L 29/06* (2006.01)

(52) U.S. Cl.
CPC .......... *H04L 65/40* (2013.01); *H04L 2209/805* (2013.01); *H04L 2209/84* (2013.01)

(58) Field of Classification Search
CPC ........... G06F 17/30241; G06K 9/0063; H04L 2209/84; H04L 2209/805; H04N 7/181
See application file for complete search history.

(56) References Cited

U.S. PATENT DOCUMENTS

| | | | |
|---|---|---|---|
| 5,979,830 A * | 11/1999 | Kellermeier | 244/158.8 |
| 6,868,340 B2 | 3/2005 | Alexander et al. | |
| 7,551,182 B2 | 6/2009 | Bethune et al. | |
| 7,898,410 B2 * | 3/2011 | Schurter | 340/539.18 |
| 8,412,724 B2 * | 4/2013 | Ioannone et al. | 707/758 |
| 9,063,544 B2 * | 6/2015 | Vian et al. | 1/1 |
| 2007/0103294 A1 * | 5/2007 | Bonecutter et al. | 340/539.18 |
| 2007/0168370 A1 * | 7/2007 | Hardy | 707/101 |
| 2008/0174593 A1 | 7/2008 | Ham et al. | |
| 2009/0087029 A1 * | 4/2009 | Coleman et al. | 382/103 |
| 2009/0232349 A1 | 9/2009 | Moses et al. | |
| 2011/0246015 A1 * | 10/2011 | Cummings et al. | 701/23 |
| 2011/0282578 A1 * | 11/2011 | Miksa et al. | 701/208 |
| 2012/0261144 A1 * | 10/2012 | Vian et al. | 169/43 |
| 2013/0278420 A1 * | 10/2013 | Araiz-Boys et al. | 340/539.18 |

* cited by examiner

*Primary Examiner* — LaShonda Jacobs
(74) *Attorney, Agent, or Firm* — C. Joan Gilsdorf

(57) ABSTRACT

A system and method for rapid dissemination of image products. In the system, a data consumer display device sends a geospatial request for a map image of a specific area of interest to a rapid image distribution system (RIDS), which forwards the request to a sensor ground station. The sensor ground station processes data received from a sensor platform and sends the processed data to a georectification processor. The georectification processor creates georectified data and sends the georectified data to the RIDS, which further processes the data, exposing it to data consumers using network optimized data services (e.g., KML/KMZ, TMS, GeoRSS, image chipper) based on geographic coordinates provided in the query that is a smaller subset of the sensor data. The RIDS sends the image product to the data consumer display device for display.

10 Claims, 15 Drawing Sheets

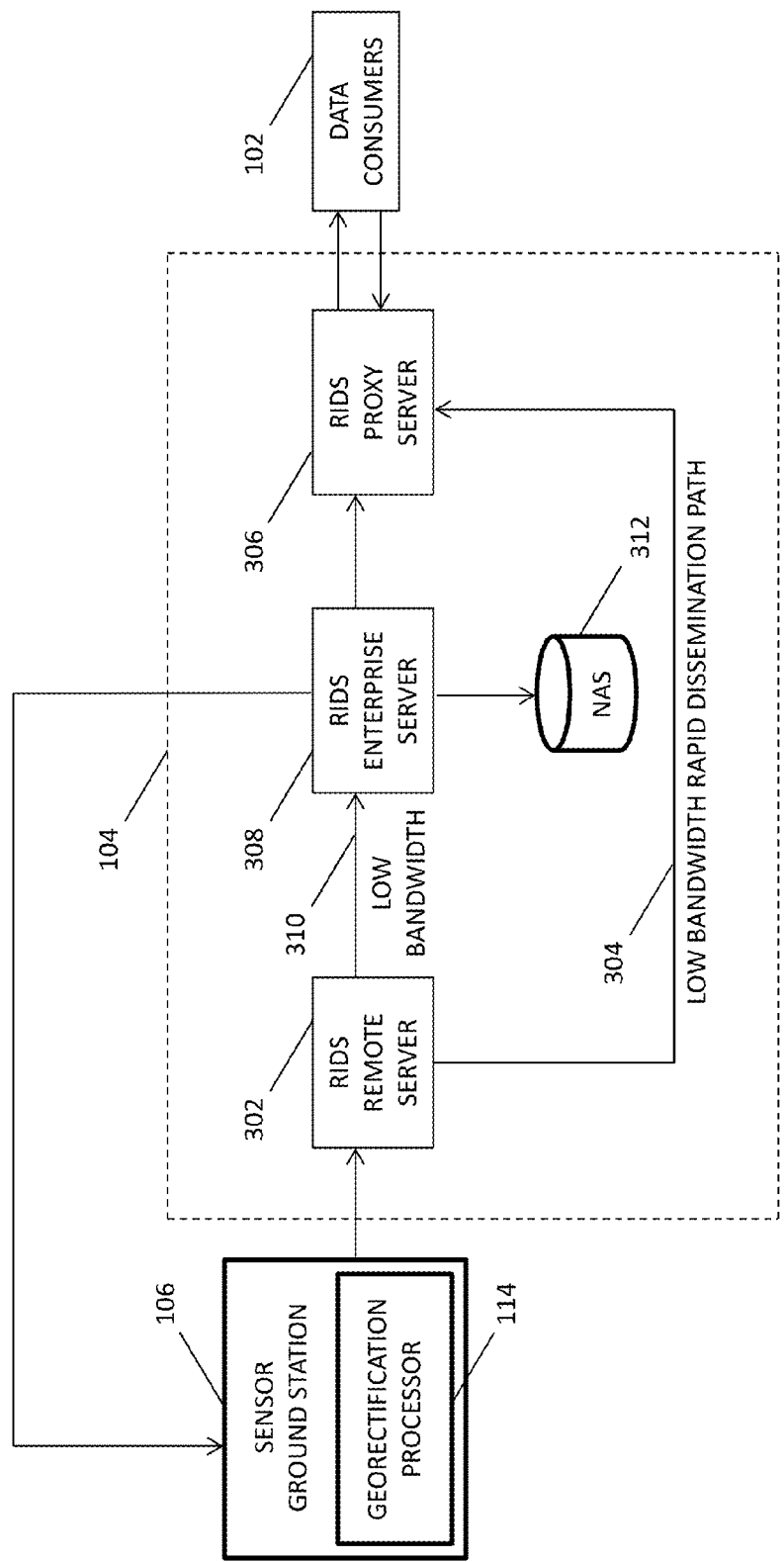

FIG. 4C
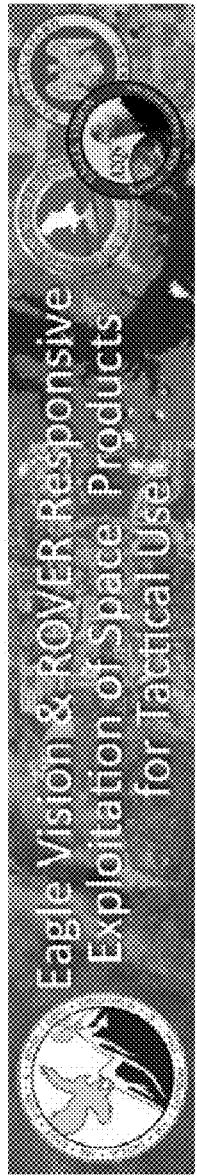
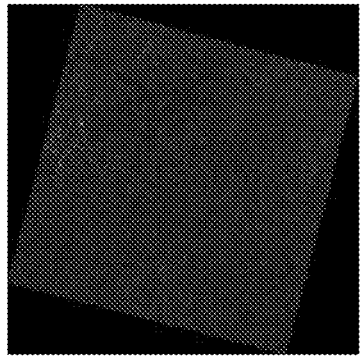
s5_msi_10m_20130206_ev60010067ortgeo_fairfield_il
Acquired: 2013-02-06 16:36:25 Z
Platform: spot5
Resolution: 10m
Bands (R,G,B): 4,3,2
Ground Station: EagleVision 6
License Type: Disaster Relief
Upload Start: 2013-02-06 21:18:46 Z
Upload Finish: 2013-02-06 15:45:44 Z
Time Available: 2013-02-06 15:46:58 Z
Stream to Google Earth    Download GIS zip archive
View TMS on Google Maps   View TMS on various Maps
Email Eagle Vision Support

SYSTEM AND METHOD FOR RAPID DISSEMINATION OF IMAGE PRODUCTS

CROSS-REFERENCE TO RELATED APPLICATION(S)

This application is related to, and claims the benefit of priority to, U.S. Provisional Patent Application No. 61/637,890, filed Apr. 25, 2012; U.S. Provisional Patent Application No. 61/637,485, filed Apr. 24, 2012; and Provisional Patent Application No. 61/620,647, filed Apr. 5, 2012, the contents of which are incorporated herein by reference in their entireties.

STATEMENT OF GOVERNMENT INTEREST

The invention described herein may be manufactured, used, and licensed by or for the U.S. Government for governmental purposes without payment of any royalties thereon.

BACKGROUND

When natural disasters strike, such as hurricanes, tornadoes, floods, and fires, emergency first responders need rapid and timely access to space-based and aerial imagery to aid in mitigation planning, allocation of resources, search and rescue, and recovery efforts. Having delayed access to space-based products creates a sub-optimal situational awareness environment. In fact, access to near "real-time" information with timely updates can make the difference between life and death.

However, delivering large imagery files to the field has taken too long, required delivery by manually transporting external media to the field, or required increasing communications bandwidth, which is costly. Responders have been left trying to make plans using outdated imagery information. Thus, a need exists to improve the dissemination of large imagery files to first responders in the field.

SUMMARY

Described herein is a system and method that mitigates the need for larger bandwidth networks, not by purchasing more costly bandwidth, but by optimizing the information on those networks and reducing the transmission time and size requirements of images while maintaining the precision and fidelity of the information. This leads to enhanced situational awareness through timely, accurate and network-friendly information.

The invention manipulates large, space-based and aerial imagery and radar products into small, manageable sizes to facilitate rapid, low-bandwidth dissemination to end-users to view on their organic geographic information system (GIS) and visual display devices. The invention accomplishes this by disseminating only the portions of the imagery that are needed rather than the entire image. This allows dissemination of the large files to users in the field via web-based services with the bandwidth already available to them for viewing on their organic computers, laptops, tablets, and smart phones using geospatial information services such as the Google Earth Enterprise Environment, ARC Explorer, Bing, Yahoo, and others. The invention also provides the capability to disseminate satellite imagery and radar products in a matter of minutes after the satellite has collected the information, allowing for timely and accurate operational support to first responders.

BRIEF DESCRIPTION OF THE DRAWINGS

Various aspects and advantages of the invention will become apparent from the following detailed description, taken in conjunction with the accompanying drawings. The drawings are not necessarily drawn to scale. In the drawings:

FIG. 3 is a more detailed block diagram of the RIDS of FIG. 1, which processes the image sensor data for rapid dissemination to data consumers, according to an embodiment of the invention;

FIG. 4C is an exemplary image thumbnail created by the RIDS of FIG. 1, according to an embodiment of the invention;

DETAILED DESCRIPTION OF THE PREFERRED EMBODIMENTS

Figure 1:
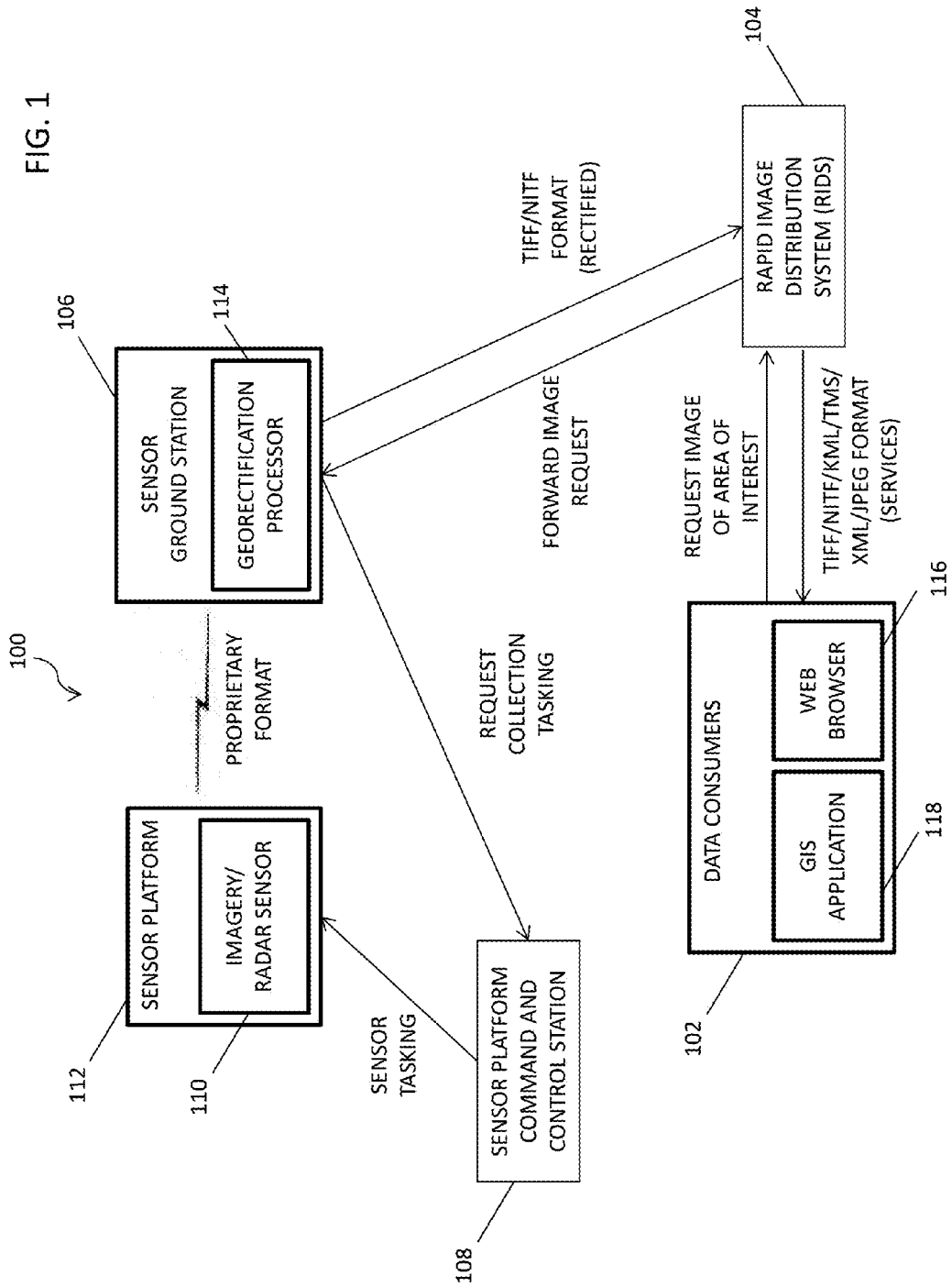
FIG. 1 is a block diagram of a system, including a Rapid Image Distribution System (RIDS), for the rapid dissemination of imagery and radar products, according to an embodiment of the invention.

FIG. 1 illustrates a system 100 for the rapid dissemination of space-based and aerial imagery products. In FIG. 1, a data consumer 102 contacts a Rapid Image Distribution System (RIDS) 104 to make a request for imagery via email or web-form submission. The request indicates the area of interest or point of interest, the resolution, and the temporal window (i.e., when the image needs to be taken). The data consumer 102 may also request data that has already been processed via thumbnails or GIS overlays, which is explained in more detail below. The RIDS 104 forwards the request to a sensor ground station 106 for refinement and standardization. The sensor ground station 106 sends a collection task to a sensor platform command and control station 108. The sensor platform command and control station 108 tasks an imagery/radar sensor 110 on a sensor platform 112 (e.g., a satellite, a plane, an unmanned aerial vehicle, etc.). The imagery/radar sensor 110 images the environment.

The imagery/radar sensor 110 then transmits the sensor data to the sensor ground station 106 using a proprietary binary format modulated to transmit via radio frequencies. The sensor ground station 106 processes the sensor data into a non-proprietary raw format. A georectification processor system 114 rectifies the image using telemetry data from the sensor platform 112 and the imagery/radar sensor 110 to create georectified, broad-area coverage TIFF or NITF formatted data. The georectified imagery/radar data are then sent to the RIDS 104 via a web-based service. The RIDS 104 processes the imagery/radar data and produces various image products and services (e.g., KML/KMZ, TMS, GeoRSS, image chipper) that are provided to the data consumer 102, such as emergency first responders, through their web browsers 116 and geographic information system (GIS) applications 118.

Figure 2:
FIG. 2 illustrates an exemplary screen display used to upload image sensor data to the RIDS of FIG. 1 using a web-based portal, according to an embodiment of the invention.

FIG. 2 illustrates an exemplary web interface 200 used to push the sensor data from the sensor ground station 106 to the RIDS 104.

The RIDS 104 is further illustrated in FIG. 3. A RIDS remote server 302 (e.g., any desktop computer, server, or laptop capable of operating an Apache HTTP server, a Red Hat Enterprise Linux (RHEL) server, or a SUSE Linux Enterprise Server (SLES)) receives the georectified data from the sensor ground station 106. The RIDS remote server 302 processes the data into network optimized image products and stores both the optimized and original image in its local metadata database (e.g., MySQL, PostgreSQL, etc.). The RIDS remote server 302 then exposes the various services (e.g., KML/KMZ, TMS, GeoRSS, image chipper) to the data consumer 102 over a low bandwidth rapid dissemination path 304 via a RIDS proxy server 306. The RIDS proxy server 306 brokers all service requests from the data consumer 102 to the RIDS remote server 302 and to a RIDS enterprise server 308. When an initial request is made, the proxy server 306 stores a copy of the response in its cache and services any subsequent identical requests with this copy. This reduces processing and network resources for the RIDS remote server 302 and the RIDS enterprise server 308. Once the RIDS remote server 302 completes processing, a compressed copy of the original georectified data and the corresponding records in the local metadata database are pushed to the RIDS enterprise server 308 over a low bandwidth connection 310. The RIDS enterprise server 308 stores georectified data and associated files on a network attached storage device (NAS) 312. The RIDS enterprise server 308 processes the georectified data into identical products and services as available from the RIDS remote server 302. The RIDS proxy server 306 detects the available services from the RIDS enterprise server 308 and switches the RIDS enterprise server 308 to the primary servicing server and places the RIDS remote server 302 as a secondary source, effectively eliminating bandwidth requirements through the low bandwidth rapid dissemination path 304 for the specific georectified image.

Figure 4A:
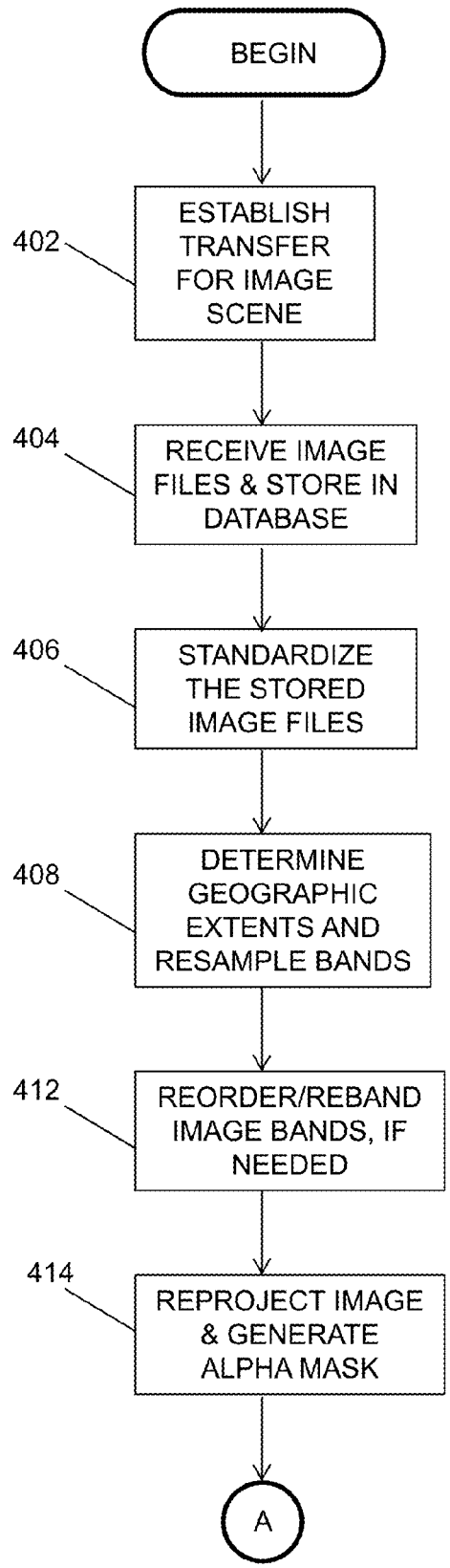
FIGS. 4A and 4B are flow diagrams of the overall method for rapid dissemination of the image sensor data according to an embodiment of the invention.
Figure 4B:
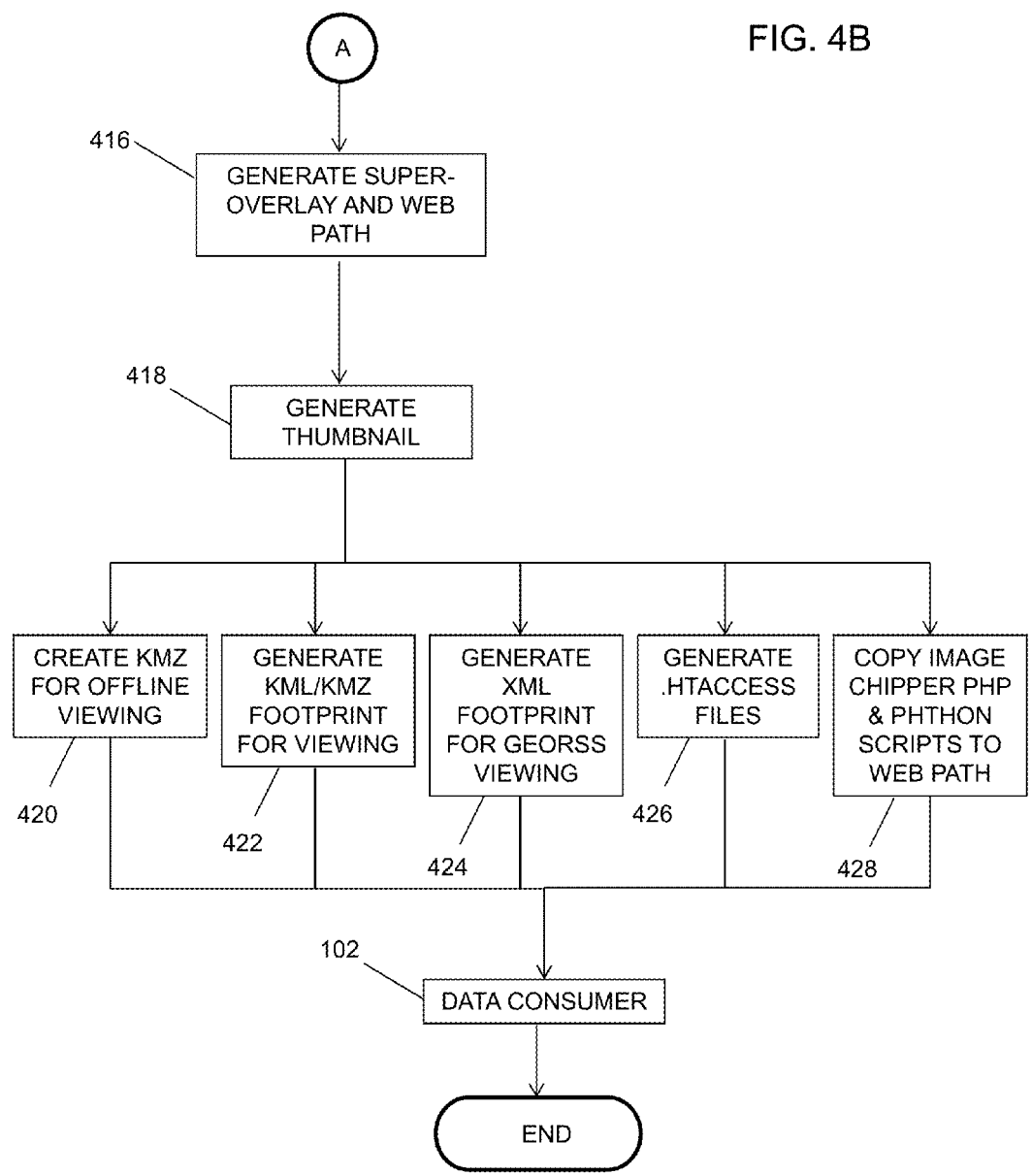

FIGS. 4A and 4B are flow diagrams of the overall method for rapid dissemination of imagery products according to an embodiment of the invention. To begin, the sensor ground station 106 pushes the image product to the RIDS remote server 302 either using the web-based portal 200 or a web-based service interface, for which the portal is a graphical user interface. The image product and associated metadata received from the georectification processor 114 are stored in the metadata database at 404.

The file format of the source files stored at 404 is standardized at 406. If the image product files received and stored were received archived (file compressed), then the file archive is unarchived. If the files received were not archived, then a file archive containing the image product and associated files is created. Both the archived and unarchived files are stored in the metadata database. The metadata database is updated, indicating that the image product is ready for further processing, and a job is created at 408 to store the geographic extents and centroid of the scene image in the metadata database and to determine the number of bits per band.

The majority of multi-spectral imagery contains greater than three bands (Red, Green, Blue) and/or bands for wavelengths falling outside the visible spectrum. In the case of radar imagery, each image band typically contains radar sensor data of differing polarizations. Due to this, the image bands are reordered/rebanded at 412, if needed. The image is reprojected and an alpha mask is generated at 414. Then, at 416, a pyramid of image tiles, commonly known as an imagery pyramid, is generated along with associated KML (Keyhole Markup Language) files, and a web path is also generated. Steps 408, 412, 414, and 416 are discussed in more detail below.

A thumbnail of the entire image scene is generated at 418 for the data consumer 102 to preview by downsampling the rebanded and reprojected image. The thumbnail image is stored in the web path created at 416. An exemplary thumbnail is illustrated in FIG. 4C.

After the thumbnail is generated, the metadata database is updated and jobs are created to create a KMZ (Keyhole Markup Language, Zipped) archive for offline viewing at 420, generate a KML and KMZ footprint of all images in the system for on-line viewing at 422, generate an XML footprint for GeoRSS viewing at 424, generate any required access control files at 426, and copy the image chipper service to the web path at 428. These steps are executed in parallel since each is independent of one another.

The complete image pyramid and associated KML files generated at 416 are archived at 420 into a KMZ file for offline viewing. This enables the data consumer 102 to download the entire optimized file for offline viewing on their GIS application 118. The file archive received at 404 or created at 406 is copied to the web path for the data consumer 102 to view as the original data as received from the georectification processor 114.

Figure 4D:
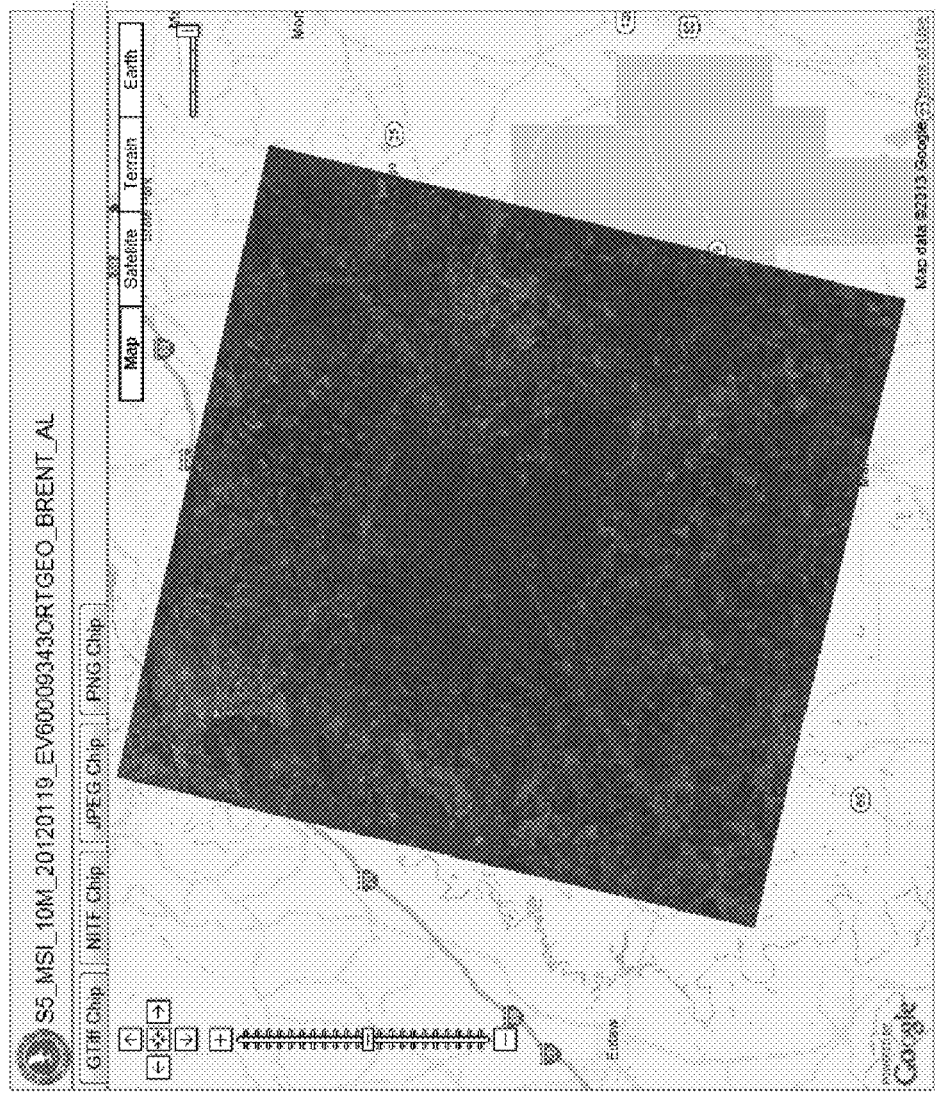
FIG. 4D is an exemplary web-based interface used by a data consumer to request delivery of an image from the RIDS of FIG. 1, according to an embodiment of the invention.
Figure 4E:
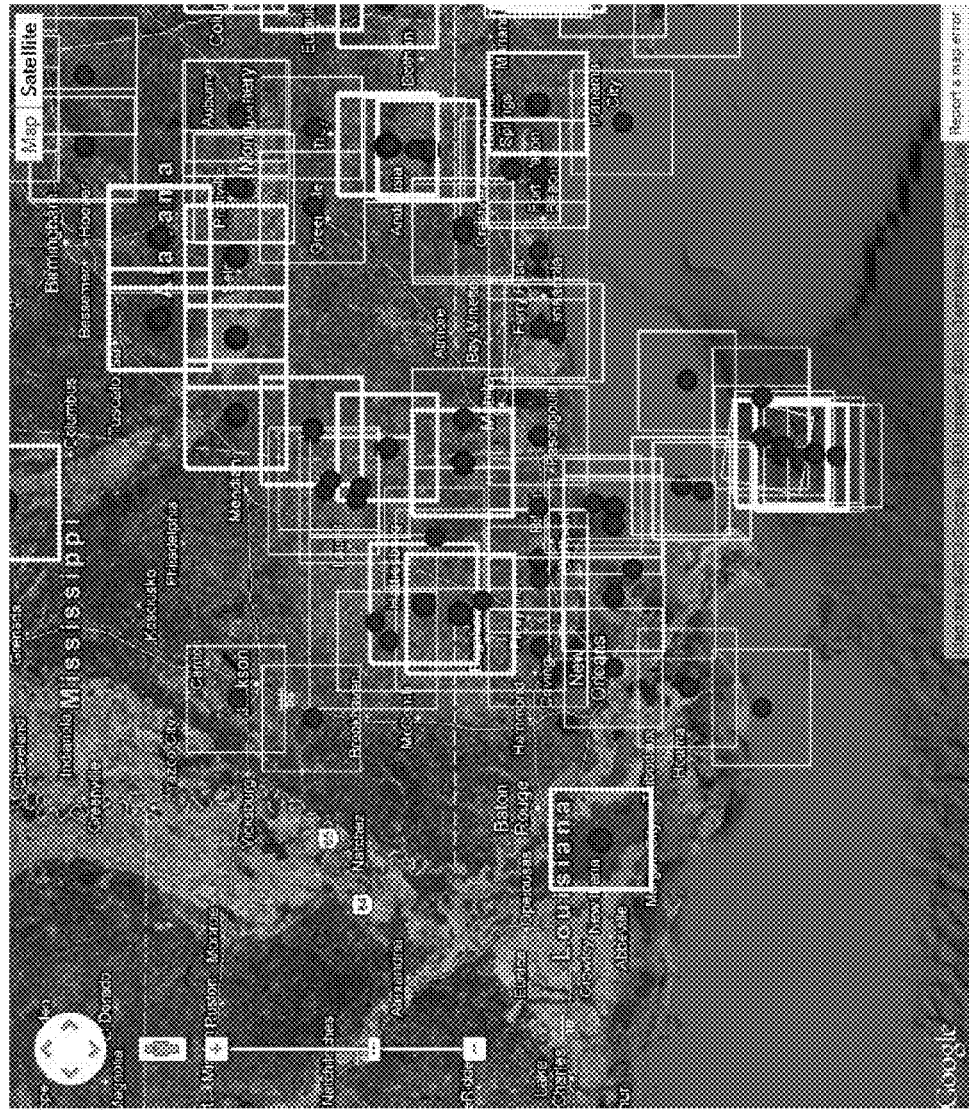
FIG. 4E is an example of a catalog created by the RIDS of FIG. 1, according to an embodiment of the invention.

To create the KML/KMZ footprint at 422, a KML of all currently available processed images in the metadata database is created. The footprint includes a center point (centroid) and polygon feature for each processed image using the geographic extents and centroids stored in the database at 408 along with the metadata stored in the database at 404. This "footprint KML" is then stored in the web root as a catalog for the data consumer 102 to view available data in the RIDS 104. A KMZ of the footprint is generated to reduce the size of the file and the per-request bandwidth used by the data consumer 102. After completion of this process, the scene is viewable by the data consumer 102 on the KML/KMZ footprint service. An example of the catalog is shown in FIG. 4E.

The XML footprint is generated at 424. An XML file adhering to a GeoRSS schema of all processed images in the metadata database is created first. This includes creating a point and polygon feature for each processed image using the geographic extents and centroids stored in the database at 408 along with the metadata stored in the database at 404. This "footprint XML" is then stored in the web root as a catalog for the data consumers 102 to view available data in the system.

The data in the metadata database is evaluated at 426 to determine a license type. If the license type is a restricted type that requires access controls, .htaccess files are generated and configured with the access permissions determined by the license type. The .htaccess files are placed in the web path location and recursively into each subdirectory. If it is determined that no access restrictions are required, .htaccess file generation is bypassed.

Image chipper service PHP (Hypertext Preprocessor) and Python scripts are copied to the web path at 428. This PHP script allows the data consumer 102 to send a geospatial query with the metadata identification (database key) of the image being processed via a web-based interface. An example interface is illustrated in FIG. 4D. The geospatial query includes a geospatially defined region (e.g., latitude and longitude extents or bounds of the query window) of the specific area of interest, a resolution, and a temporal window. Once received, the PHP script passes this information off to the Python script. The Python script then retrieves the metadata information from the metadata database and uses a Geospatial Data Abstraction Library (GDAL) to create a subset of the original image based on the geographic coordinates passed from the PHP script. This single file, chipped image is then returned to the data consumer 102 via a web-based file download.

Figure 5:
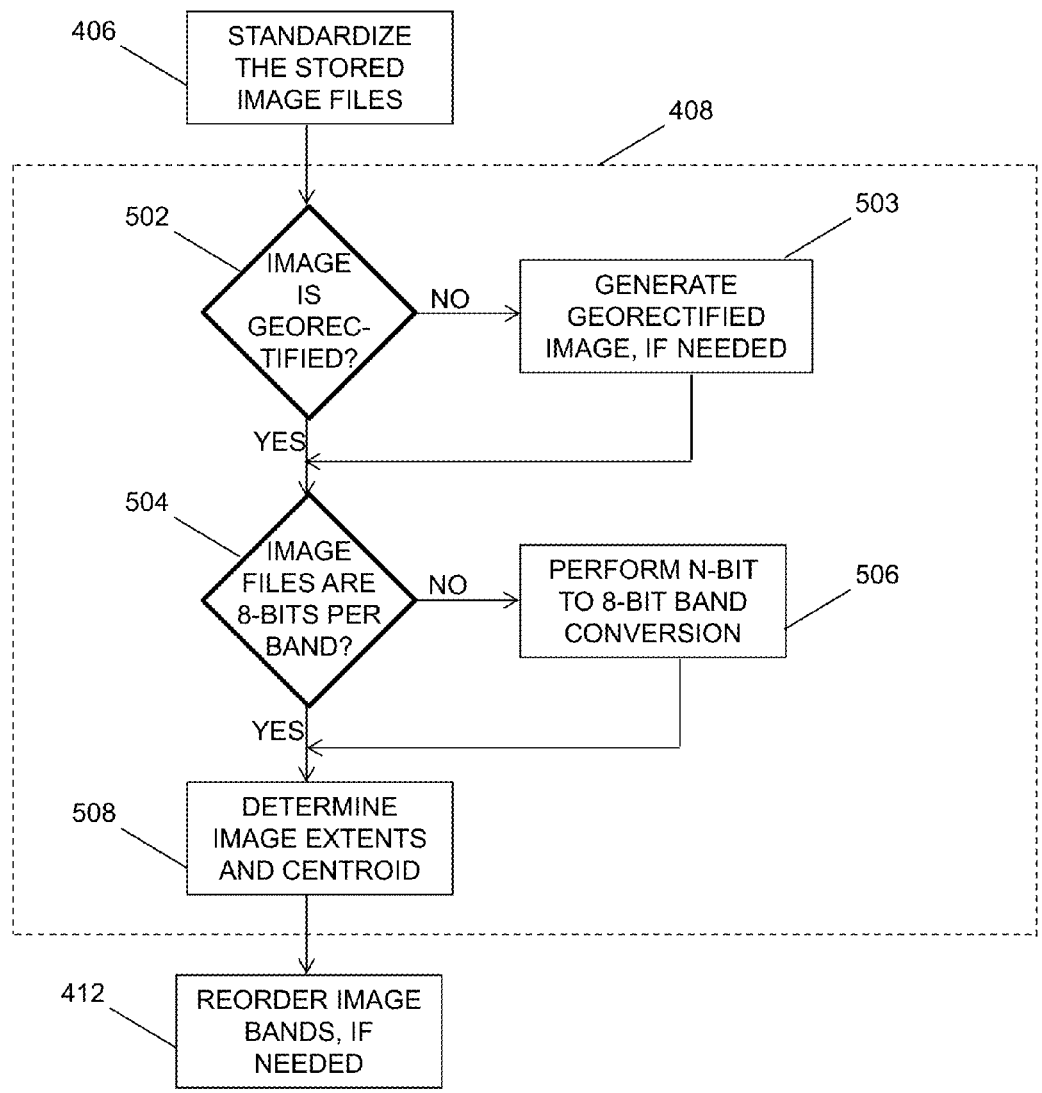
FIG. 5 is a flow diagram of the determination of geographic extents and centroids of the image sensor data.

The determination at 408 of the geographic extents and centroid of the image and the number of bits per band is discussed in more detail in reference to FIG. 5. Whether the image has been georectified is determined at 502. If the image has not been georectified, a job is added to the job stack to generate a georectified image at 503. If the image has been georectified, then whether the stored image files are 8-bits per band is determined at 504. If the image file is not 8-bits per band, a job is added to the job stack to perform band normalization at 506. The band normalization resamples the n-bit bands in the image file to an 8-bits per band image. Band normalization is performed because not all GIS applications can access image files containing bands having more than 8-bits. When the image file is 8-bits per band, the geographic extents and centroids of the stored GIS files are determined at 508 using the GDAL software library and this information is stored in the metadata database. When the georectified image file is 8-bits per band and the geographic extents and centroid are determined, the metadata database is updated and a job is created to reorder the image bands (also known as rebanding) at 412.

Figure 6:
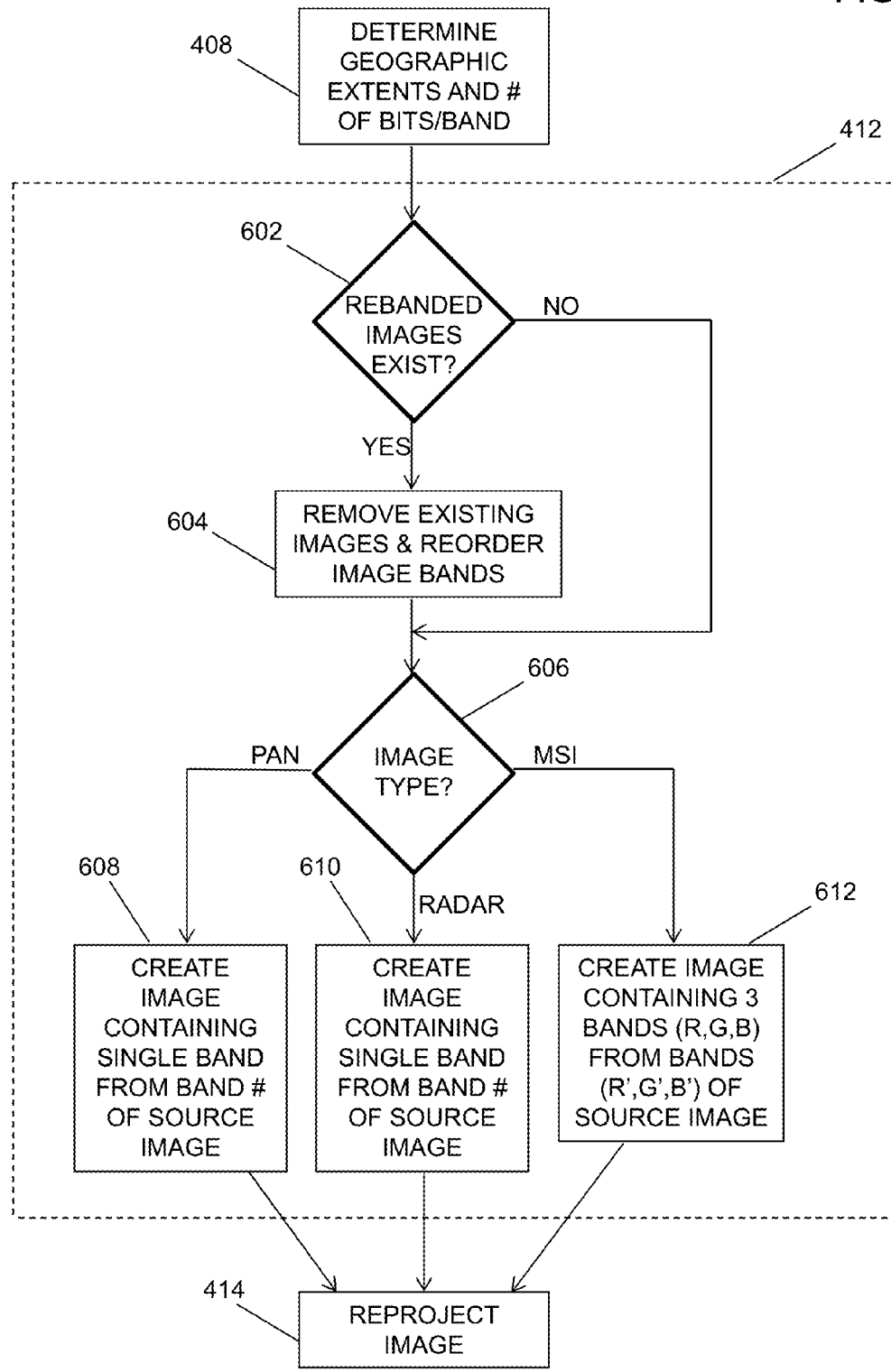
FIG. 6 is a flow diagram of the reordering/rebanding of the image bands of the image sensor data.

The reordering/rebanding of the image bands at 412 is discussed in more detail in reference to FIG. 6. Whether any rebanded images exist (from a previously processed scene) is determined at 602. If rebanded images exist, they are removed at 604 and the image bands are reordered. The type of image is determined at 606. If the metadata indicates that the image is panchromatic (PAN), the GDAL library is used to create at 608 a new image containing a single band from a specified band '#' of the image file. Thus, a multi-banded image may be displayed as a PAN image, if desired. If the image is a radar product, the GDAL library is used to create at 610 a new image containing a single band from the specified band '#' of the image file. If the metadata indicates that the image is a multispectral image (MSI), the GDAL library is used to create at 612 a new image containing 3 bands (R,G,B) from bands (R',G',B') of the source image, defined by the sensor ground station 106 and recorded in the metadata database at 404. All images produced are 8-bits per band regardless of the number of bands. After the image bands are reordered, the metadata database is updated and a job is created to reproject the image and generate an alpha mask at 414.

Figure 7:
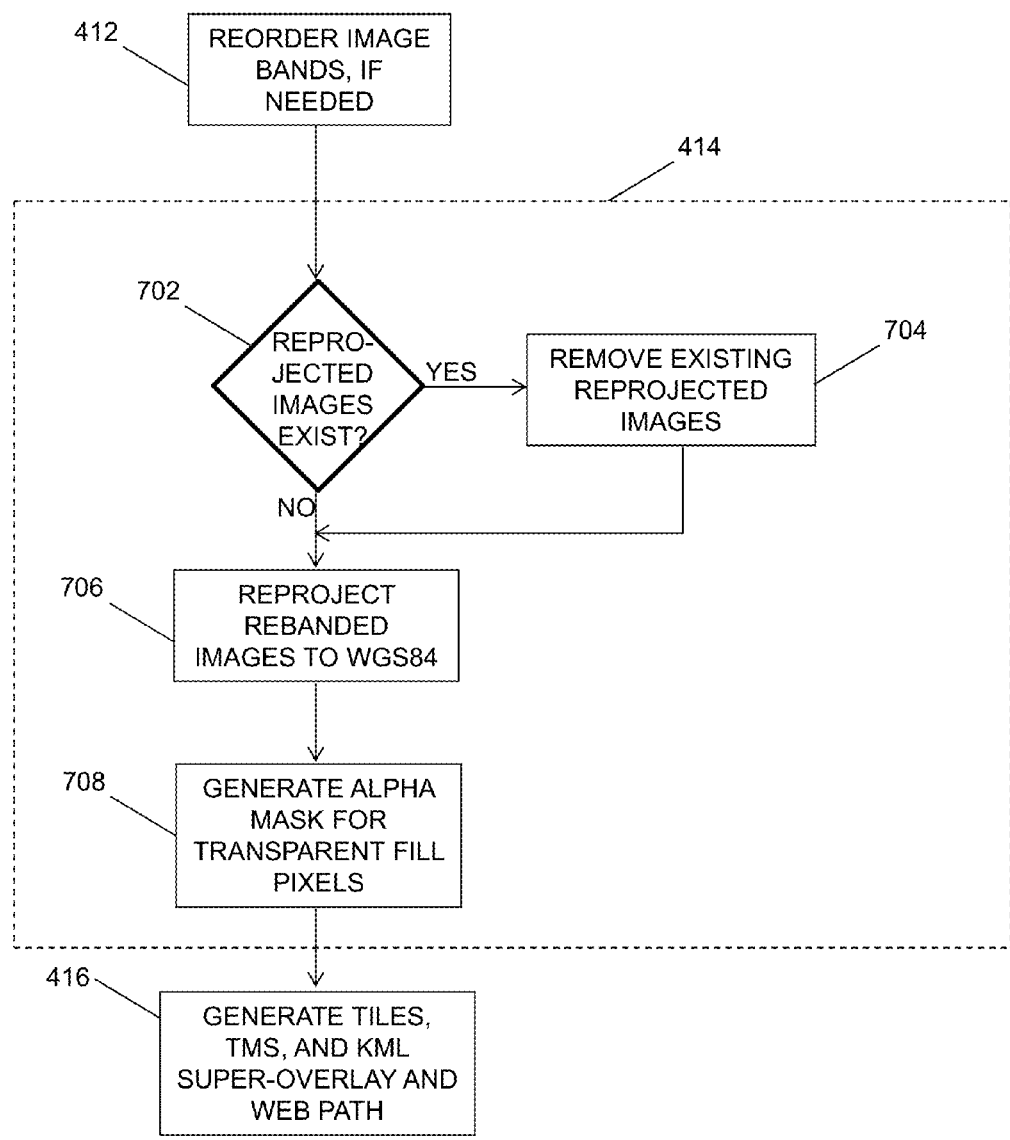
FIG. 7 is a flow diagram of reprojecting the image.

Reprojecting the image and generating an alpha mask at 414 is discussed in more detail in reference to FIG. 7. Whether any reprojected images exist is determined at 702. Any reprojected images that already exist in the database are removed at 704. The rebanded images are reprojected at 706 to WGS84 (World Geodetic System 1984) Geographic Coordinate System projection using a resampling method such as nearest neighbor. An alpha mask is generated at 708 to add transparent fill pixels where needed to maintain a rectangular pixel array. After the rebanded image is reprojected and the alpha mask is generated, the metadata database is updated and a job is created to generate tiles and KML files and the web path at 416.

Figure 8:
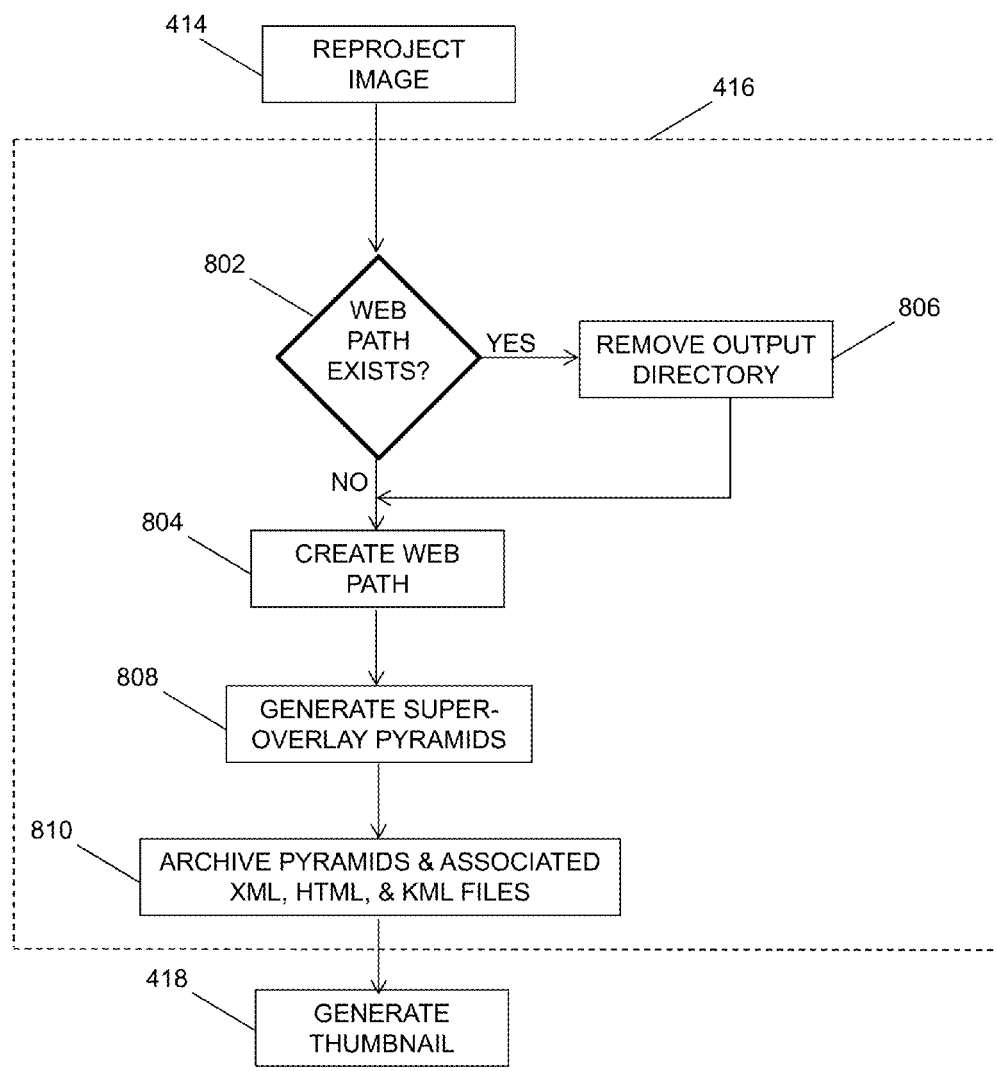
FIG. 8 is a flow diagram of generating a super-overlay for the image.

The generation at 416 of the pyramid and tiles, the KML files, and the web path is discussed in more detail in reference to FIG. 8. Whether a web path exists for the output files is determined at 802. If the output path already exists due to a previously processed image, any existing output directory is removed at 806 to eliminate any trace of the previously generated files for the output of the current image. If the web path does not exist, one is created at 804.

The super-overlay imagery pyramids and tiles, which are based upon the Tile Map Service (TMS) Specification, and associated metadata are generated at 808 for the web-based mapping services viewable by data consumers 102 using web browsers 116 with services such as Google Maps, and GIS applications 118, by calling a GDAL utility (gdal2tiles.py). Once the pyramids and associated XML, HTML, and KML files have been created, the files are compressed and zipped by creating a KMZ at 810 of the document root KML with the name of the image scene so that the scene name is visible when importing into the data consumer's GIS system, such as Google Earth. The super-overlay created includes symbology (e.g., symbols denoting PAN, MSI, radar, etc.) based on metadata records. Then the metadata database is updated and a job is created to generate a thumbnail for the scene image at 418.

Figure 9:
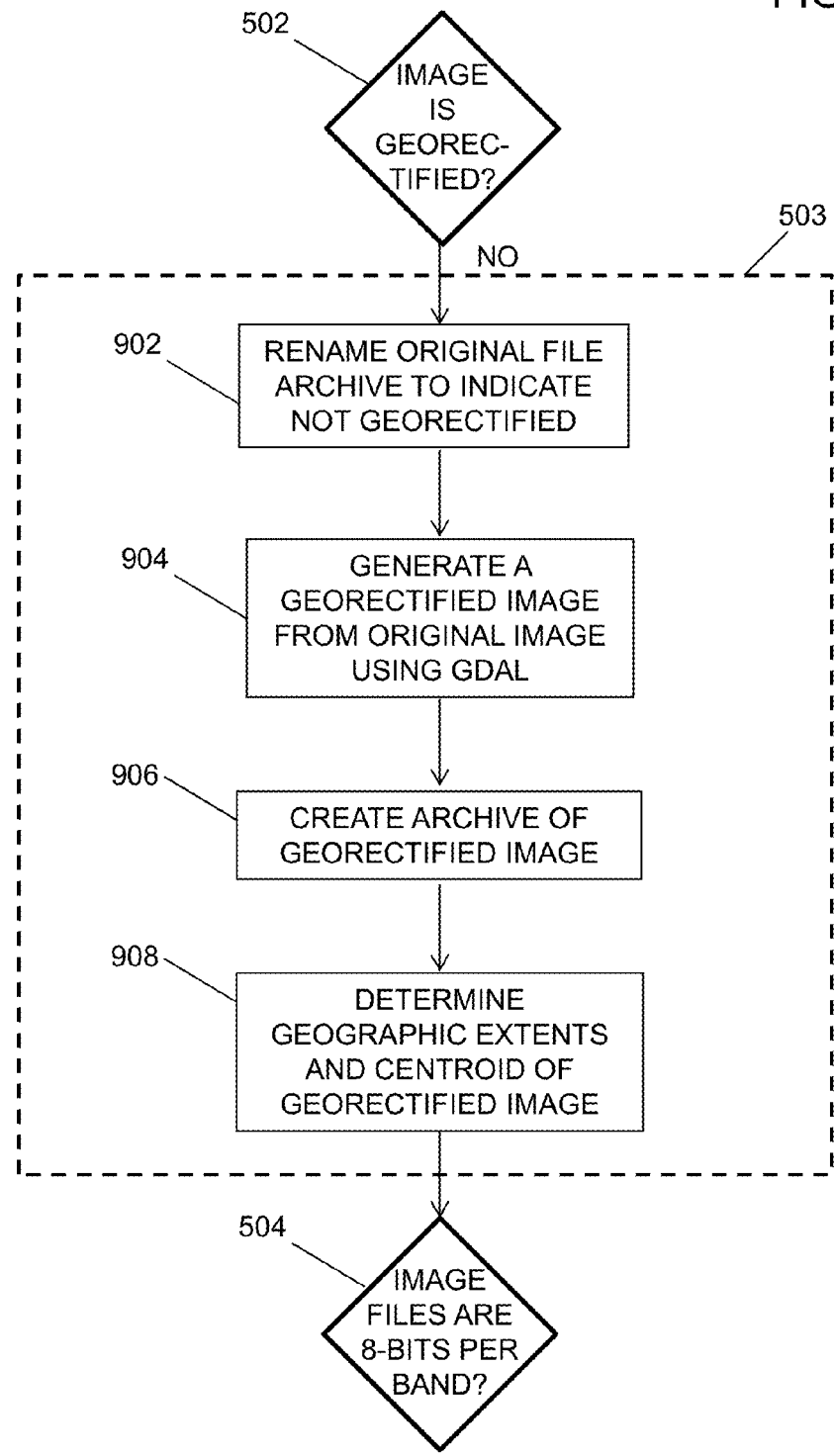
FIG. 9 is a flow diagram of generating a georectified image.

The generation of a georectified image at 503 is discussed further in reference to FIG. 9. First, the archive of the original image file and associated files is renamed at 902 to indicate that it does not contain georectified imagery. The GDAL libraries are used to generate a georectified image from the original image at 904. An archive of the georectified image and associated files is created at 906. The new geographic extents and centroid of the georectified image are determined at 908 and the metadata database is updated to reflect the changes. A job is then created to either sample the image bands at 504, or determine the extents of the image and centroid in 508. The image bands are then reordered if needed in 412.

Figure 10:
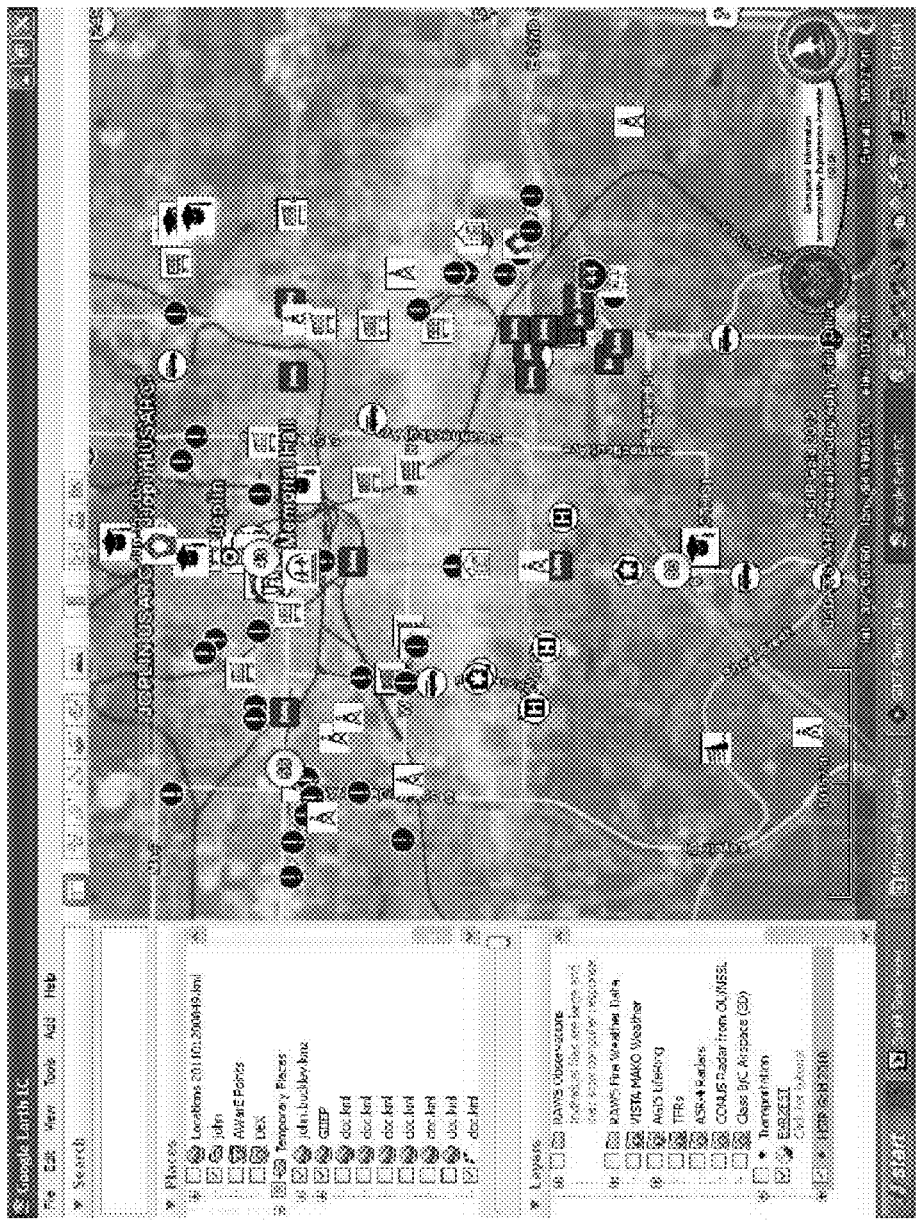
FIG. 10 illustrates an example of an image product delivered to the a data consumer, according to an embodiment of the invention.

FIG. 10 illustrates an example of an image product of wildfire activity, including symbology, that has been delivered to the data consumer 102.

Figure 11:
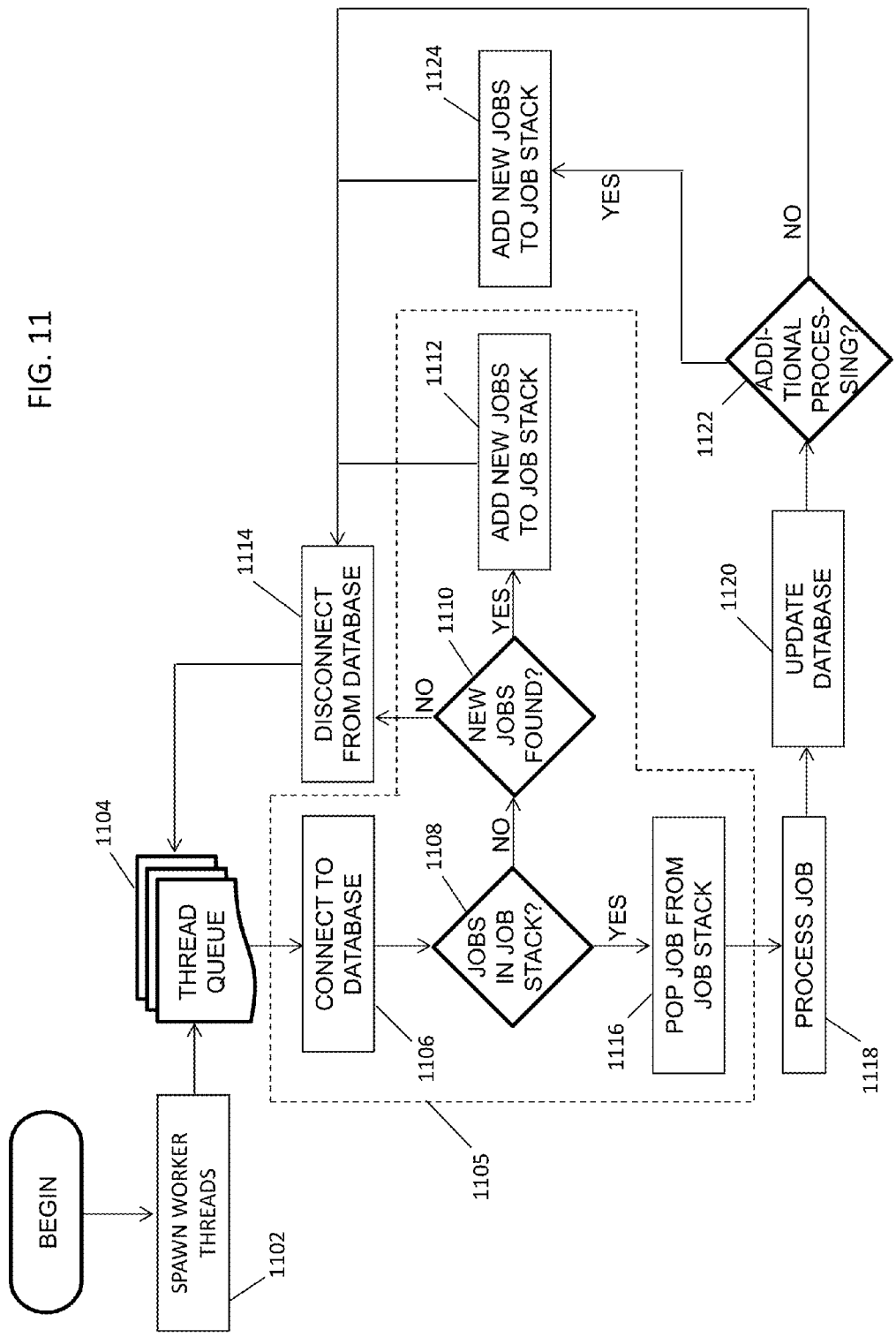
FIG. 11 is an exemplary flow chart for implementing job control.

FIG. 11 is an exemplary flow chart for implementing job control within the RIDS remote server 302 and the RIDS enterprise server 308. The job subroutines may be written as scripts in languages such as C, C++, Java, Pearl and Python. The jobs call processing modules that process the image data to create the image products. Upon starting, the main function determines the maximum number of CPU threads that can be executed concurrently without time sharing. For example, a system having a ×2 or dual CPU socket populated with ×4 cores per CPU with each core being hyper-threaded and executing ×2 threads yields 2×4×2=16 simultaneous threads. Once the maximum number of concurrent threads (i.e., MAX_THREADS) is determined, the main function spawns MAX_THREADS number of threads of type Worker Class at 1102. Worker Class is an object containing a template routine for all worker threads to instantiate. Each worker thread has separate memory space and CPU resources associated with its Worker Thread object instance. The threads then wait in a self-generated queue created at 1104 using a thread lock to control access to a critical section 1105 in the Worker Class.

The critical section 1105 is controlled using a global thread lock so that only a single thread may enter the critical section. This section prevents contention when accessing the job stack. Once setting the thread lock, the thread establishes a connection to the metadata database at 1106. Then the thread evaluates the job stack at 1108. If the stack is empty, then the thread searches the database at 1110 for new jobs that have been added, adding the new jobs to the job stack at 1112. Once all new jobs from the database have been added to the job stack, the thread unlocks the thread lock and disconnects from the database at 1114, and returns to the thread queue at 1104.

When there is a job in the job stack, the thread pops a job from the stack at 1116 (i.e., reads the last job entered in the stack and then removes it from the stack) and unlocks the thread lock. Next, the thread evaluates at 1118 which function to execute based on the location in the processing flow of FIGS. 4A to 9. The function updates the database at 1120 and, if additional jobs are required for processing at 1122, adds the new jobs to the job stack at 1124. Once the function has completed, the thread disconnects from the database at 1114, and returns to the thread queue at 1104.

To conclude, the invention described herein is used to facilitate the tasking of sensor resources and process, web-optimize, and share geospatial imagery and radar information with federal, state, and local emergency managers in a timely, bandwidth-efficient manner. The invention eliminates long delays in dissemination of imagery to the field, which improves situational awareness and allows emergency responders to better perform their tasks. For example, pre-incident imagery can be compared with post-incident imagery to identify changes and determine location of damaged areas and damage to critical infrastructure. For example, the imagery can be used to direct rescue crews to areas needing assistance and to identify routes into these areas so that the crews are not sent to unaffected areas or to areas where crews have already arrived, which saves valuable time and resources. Also, the images can be used to focus resources where they are needed and to alert and prepare crews on what to expect before arriving. For example, the expected path of a tornado can be plotted and a resulting map given to responders to establish search, rescue and recovery efforts.

The invention has been described with respect to rapidly disseminating imagery to civilian emergency first responders. In addition, the invention can be used to improve situational awareness for warfighters. For example, this system could be installed on an airborne imaging platform directly and disseminate geospatial data through localized data networks to ground forces allowing those forces to develop detailed plans for time-critical operations with the most up to date imagery intelligence. This system can also be used by UAS (Unmanned Aircraft Systems) ground stations to disseminate geospatial imagery and radar products from their remote locations to forward forces using low bandwidth communications such as satellite communications (SATCOM). Also, a video mosaicing technology can be incorporated to create georectified full-motion-video (FMV) mosaics of the earth from altitude, generating a larger, high-fidelity coverage of the earth in an efficient manner for time-critical intelligence collections.

The invention described herein has also been described as pertaining to applications for information sharing between systems hosted on compartmentalized networks. These compartmentalized networks require data to flow in one direction for replication on the adjacent network. The RIDS enterprise server can subsequently be used to push data to a subsequent RIDS enterprise server located on another network enclave in a different geographic location for use in globally distributed geographic information systems (GIS) warehouses. This process can happen serially or in parallel and can support numerous horizontally or vertically integrated server structures. In parallel, the replication of data occurs on a geometric progression based on the concurrency of data pushes. The invention can also support numerous RIDS remote servers pushing data to either a single or numerous RIDS enterprise servers.

Thus, it will be appreciated by those skilled in the art that modifications and variations of the present invention are possible without departing from the principles and spirit of the invention, the scope of which is defined in the appended claims and their equivalents.

What is claimed is:

1. A system for rapid dissemination of image products, comprising:
   a rapid image distribution system having a remote server, an enterprise server, and a proxy server;
   a data consumer display device sending an initial geospatial request for a map image of a specific area of interest to the proxy server of the rapid image distribution system, the proxy server forwarding the request to the enterprise server;
   a sensor ground station having a georectification processor and receiving the request from the enterprise server of the rapid image distribution system;
   a sensor platform command and control station, the sensor ground station sending a collection task to the sensor platform command and control station; and
   a sensor platform having an imagery/radar sensor, the sensor platform command and control station tasking the imagery/radar sensor to image an environment containing the specific area to collect sensor data, the imagery/radar sensor transmitting the collected sensor data having a first format to the sensor ground station, the sensor ground station processing the sensor data into a second format and sending it to the georectification processor, and the georectification processor rectifying the sensor data to create georectified data and sending the georectified data to the rapid image distribution system via the remote server, wherein
   the remote server, as primary servicing server, processes the georectified data to create image services optimized for distribution on a low bandwidth rapid dissemination path to the data consumer display device through the proxy server while concurrently pushing a compressed georectified data product and associated metadata to the enterprise server, the proxy server storing a copy of a response to the initial request,
   the proxy server, when seeing a subsequent request for the same map image, services the subsequent request using its stored copy of the previously requested data, and
   the enterprise server processes the georectified data to create the same image services optimized for network distribution and switches to the primary servicing server to disable the low bandwidth rapid dissemination path, the remote server becoming a secondary servicing server, and the enterprise server routing the image services through the proxy server to the data consumer display device for display.

2. The system of claim 1, wherein the geospatial request is sent via electronic mail or web-form submission.

3. The system of claim 1, wherein the geospatial request includes a geospatially defined region of the specific area of interest, a resolution, and a temporal window.

4. The system of claim 1, wherein the georectified data includes telemetry data from the sensor platform and the imagery/radar sensor.

5. The system of claim 1, wherein the proxy server brokers all service requests to the remote server and to the enterprise server.

6. The system of claim 1, wherein the proxy server stores a copy of the response to the initial request in its cache and services any subsequent identical requests for the same map image with the copy, reducing processing and network resources for the remote server and the enterprise server.

7. A method for rapid dissemination of image products, comprising:
   receiving, from a data consumer display device, an initial geospatial request for a map image of a specific area by a rapid image distribution system having a remote server, an enterprise server, and a proxy server;
   forwarding the request, by the enterprise server of the rapid image distribution system, to a sensor ground station;
   receiving, by the sensor ground station, sensor data from a sensor platform;
   georectifying, by a georectification processor, the sensor data to create georectified data, the georectification processor sending the georectified data to the remote server of the rapid image distribution system via a web-based service and storing the georectified data and associated metadata in a database;
   processing, by the remote server as primary servicing server, the georectified data to create image services based on geographic coordinates provided in the geospatial query that is a smaller subset of the sensor data
   routing the image services over a low bandwidth raid dissemination path to the data consumer display device for display via the proxy server while concurrently pushing a compressed georectified data product and associated metadata to the enterprise server, and storing a copy of a response to the initial request by the proxy server;
   storing the associated metadata in a database creating a searchable federated catalog of data services available at both the enterprise server and the remote server;
   processing, by the enterprise server, the georectified data to create the same image services optimized for network distribution;
   servicing a subsequent request for the same map image by the proxy server using its stored copy of the previously requested data; and
   switching, when the image services are available at the enterprise server, the enterprise server to the primary servicing server and the remote server to a secondary servicing server to discontinue use of the low bandwidth rapid dissemination path, and the enterprise server routing the image services through the proxy server to the data consumer display device for display.

8. The method of claim 7, wherein said georectifying the sensor data to create georectified data comprises using telemetry data from the sensor platform and the imagery/radar sensor.

9. The method of claim 7, wherein said processing, by the rapid image distribution system, the georectified data to create image services comprises:
   generating an imagery pyramid from the georectified data;
   generating a web path;
   generating a thumbnail image of the specific area of interest from the imagery pyramid for presentation to the data consumer display device and storing the thumbnail image in the web path; and
   creating a chipped image of the specific area of interest from the imagery pyramid.

10. The method of claim 9, wherein said processing, by the rapid image distribution system, the georectified data to create image services further comprises performing in parallel:
   creating an archive of the imagery pyramid for offline viewing on the data consumer display device;
   creating a KML/KMZ footprint from all processed images stored in the database as a catalog service utilized by the data consumer for on-line viewing;
   creating an XML footprint adhering to a GeoRSS schema from all processed images stored in the database as a catalog service utilized by the data consumer for GeoRSS viewing;
   generating access control files, if needed; and
   placing a chipper service in the web path.

* * * * *